No. 708,449. Patented Sept. 2, 1902.
P. YOE.
CASH REGISTER.
(Application filed Sept. 19, 1898.)
(No Model.) 9 Sheets—Sheet 2.

WITNESSES: INVENTOR.
Wm McCarthy Philip Yoe
William Muzzy BY Alvan Macauley
ATTORNEY.

No. 708,449. Patented Sept. 2, 1902.
P. YOE.
CASH REGISTER.
(Application filed Sept. 19, 1898.)
(No Model.) 9 Sheets—Sheet 4.

WITNESSES:
Wm. McCarthy
William Muzzy

INVENTOR.
Philip Yoe
BY Alvan Macauley
ATTORNEY.

No. 708,449. Patented Sept. 2, 1902.
P. YOE.
CASH REGISTER.
(Application filed Sept. 19, 1898.)
(No Model.) 9 Sheets—Sheet 6.

WITNESSES:
Wm. McCarthy
William Muzzy.

INVENTOR
Philip Yoe
BY
Alvan Macauley
ATTORNEY.

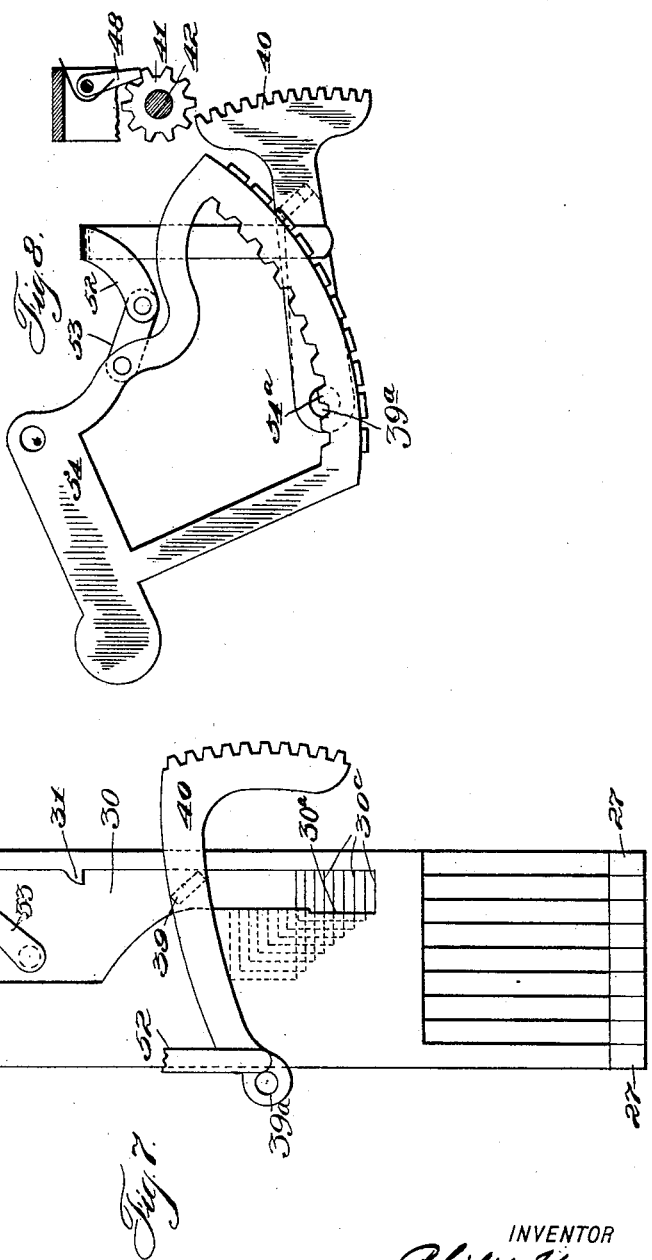

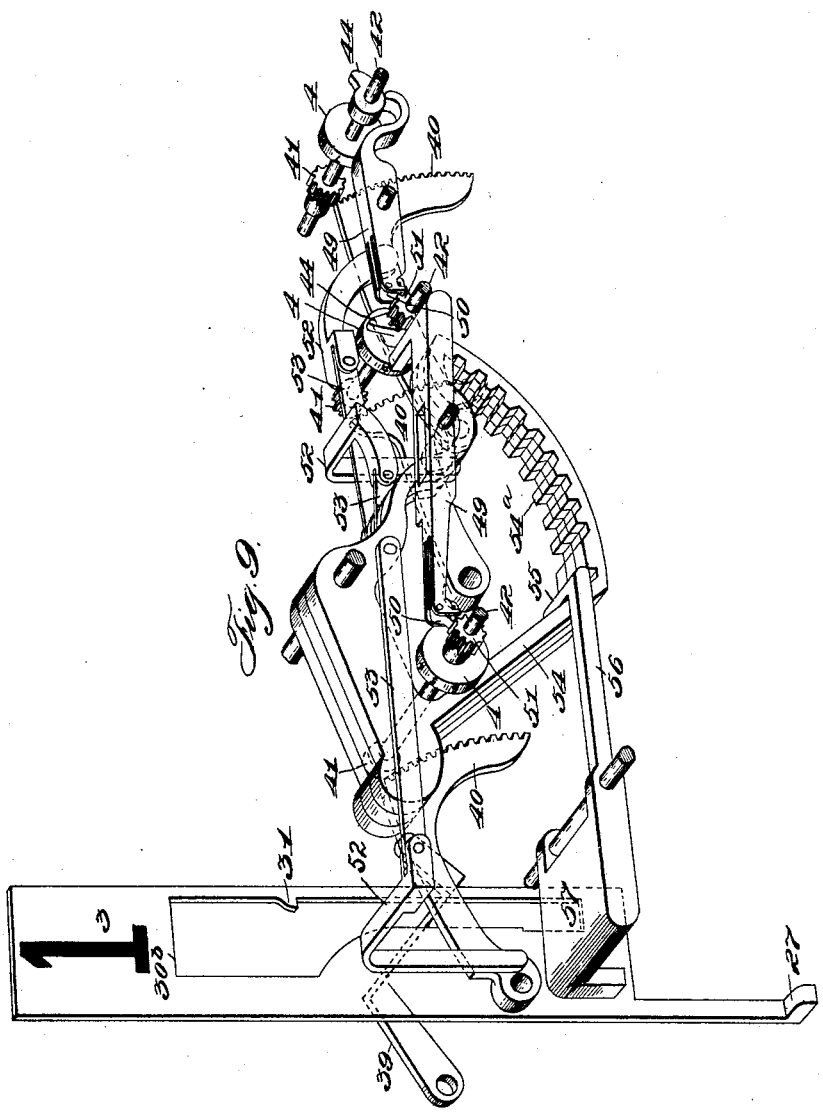

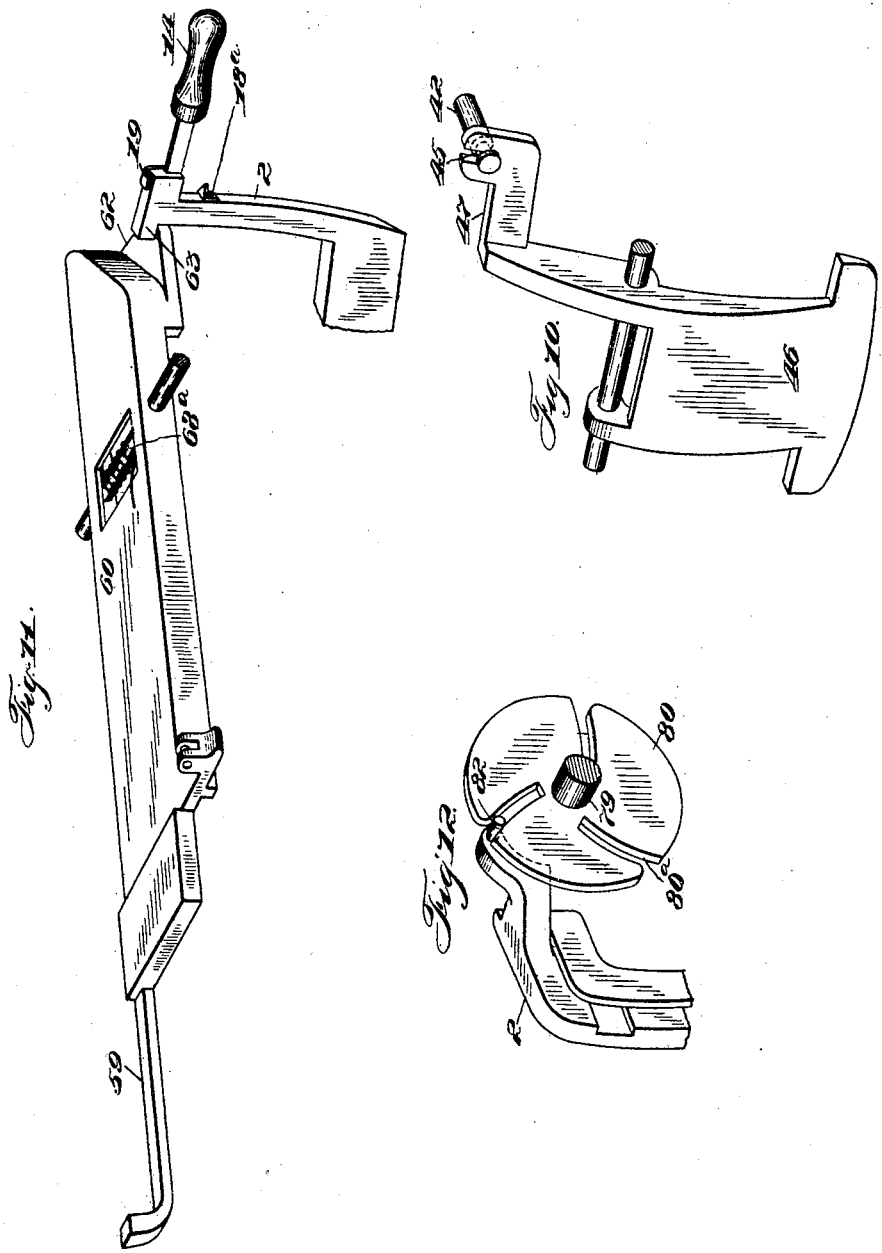

UNITED STATES PATENT OFFICE.

PHILIP YOE, OF DAYTON, OHIO, ASSIGNOR, BY MESNE ASSIGNMENTS, TO NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 708,449, dated September 2, 1902.

Application filed September 19, 1898. Serial No. 691,335. (No model.)

*To all whom it may concern:*

Be it known that I, PHILIP YOE, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash-registers, and has more particular relation to improvements in registers adapted to register, indicate, and print both a detail-strip and a check.

The primary object of the invention is to provide devices of an improved and novel type for accomplishing the purposes stated.

Figure 1:
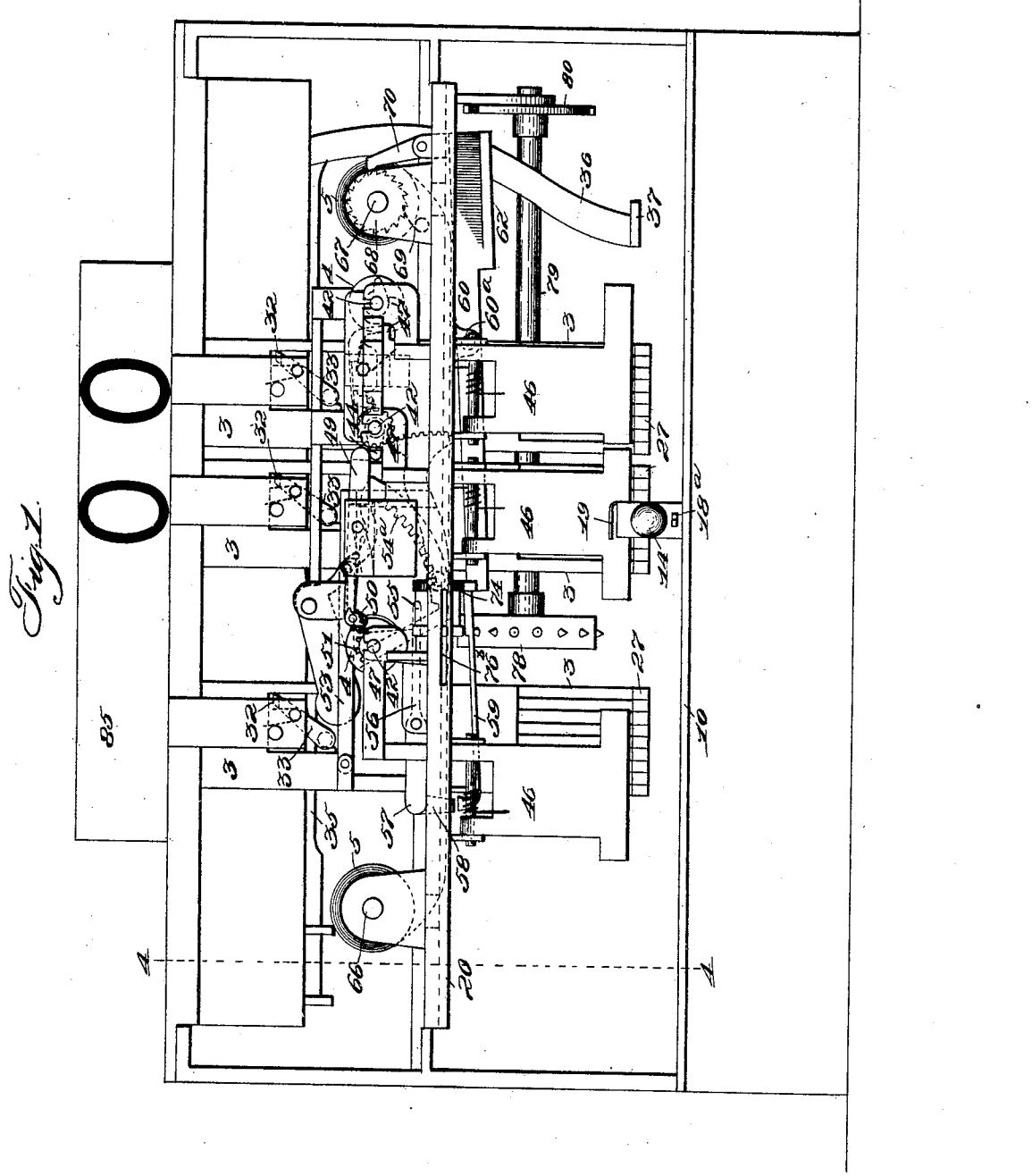
Figure 2:
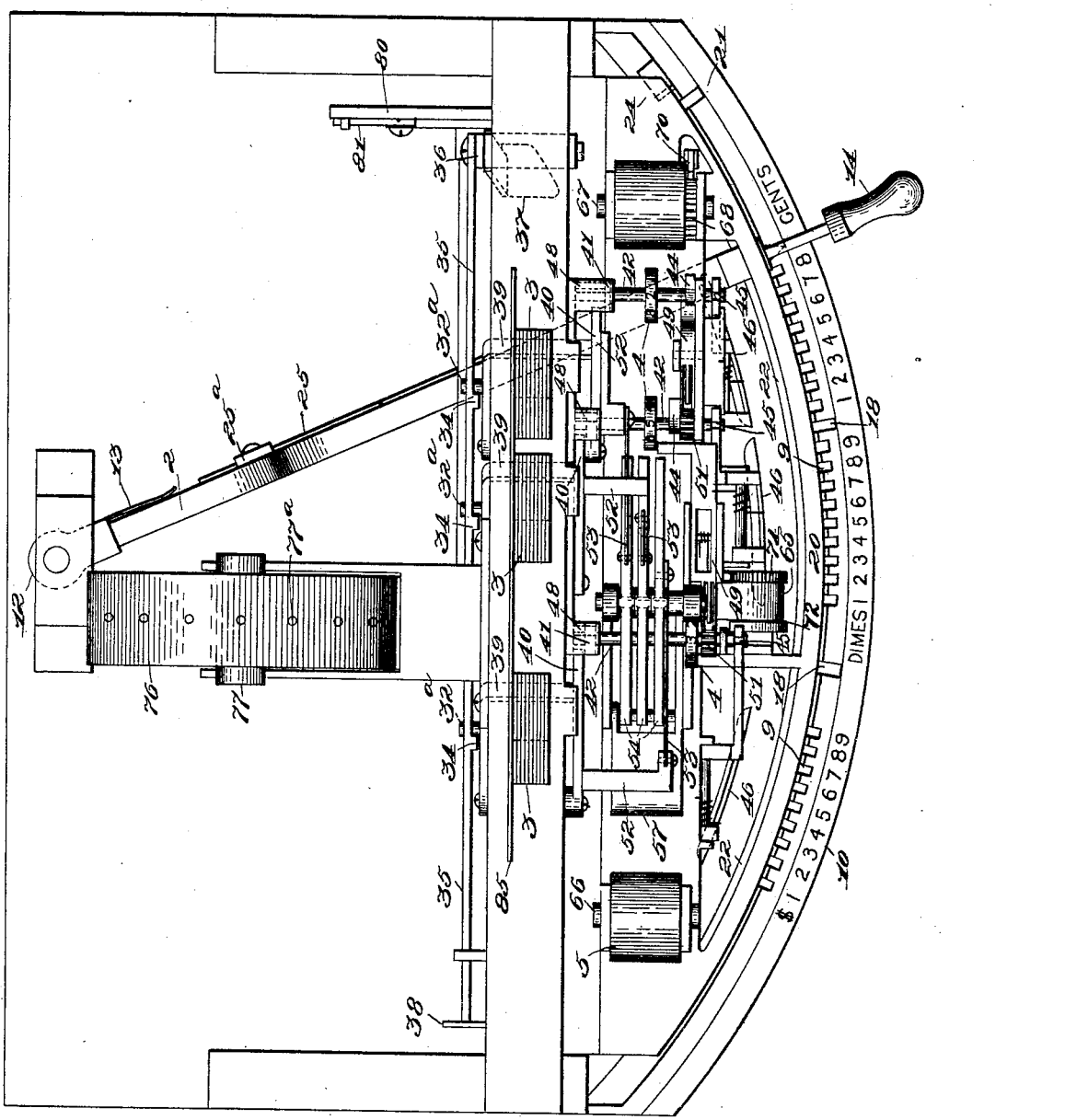
Figure 3:
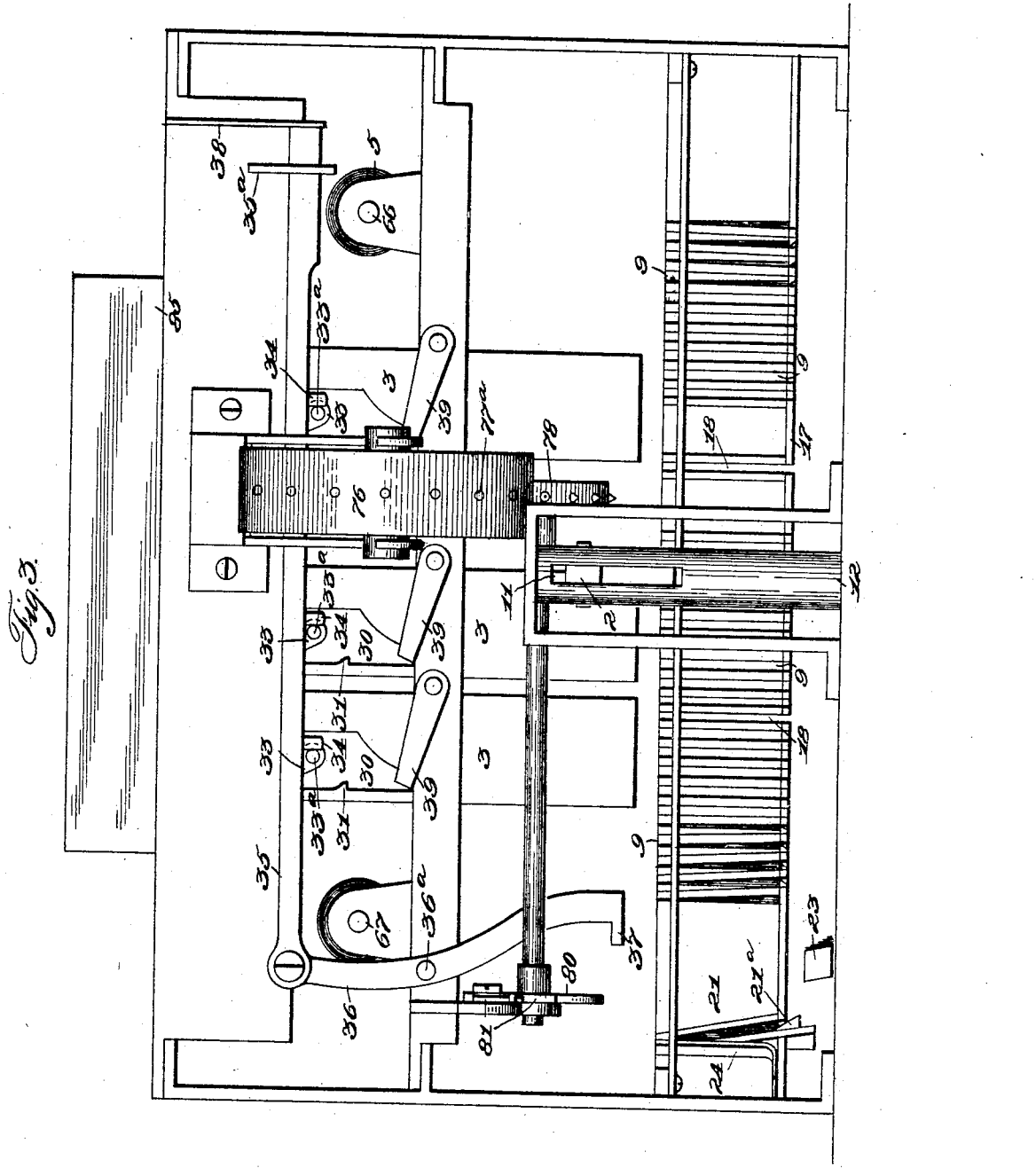
Figure 4:
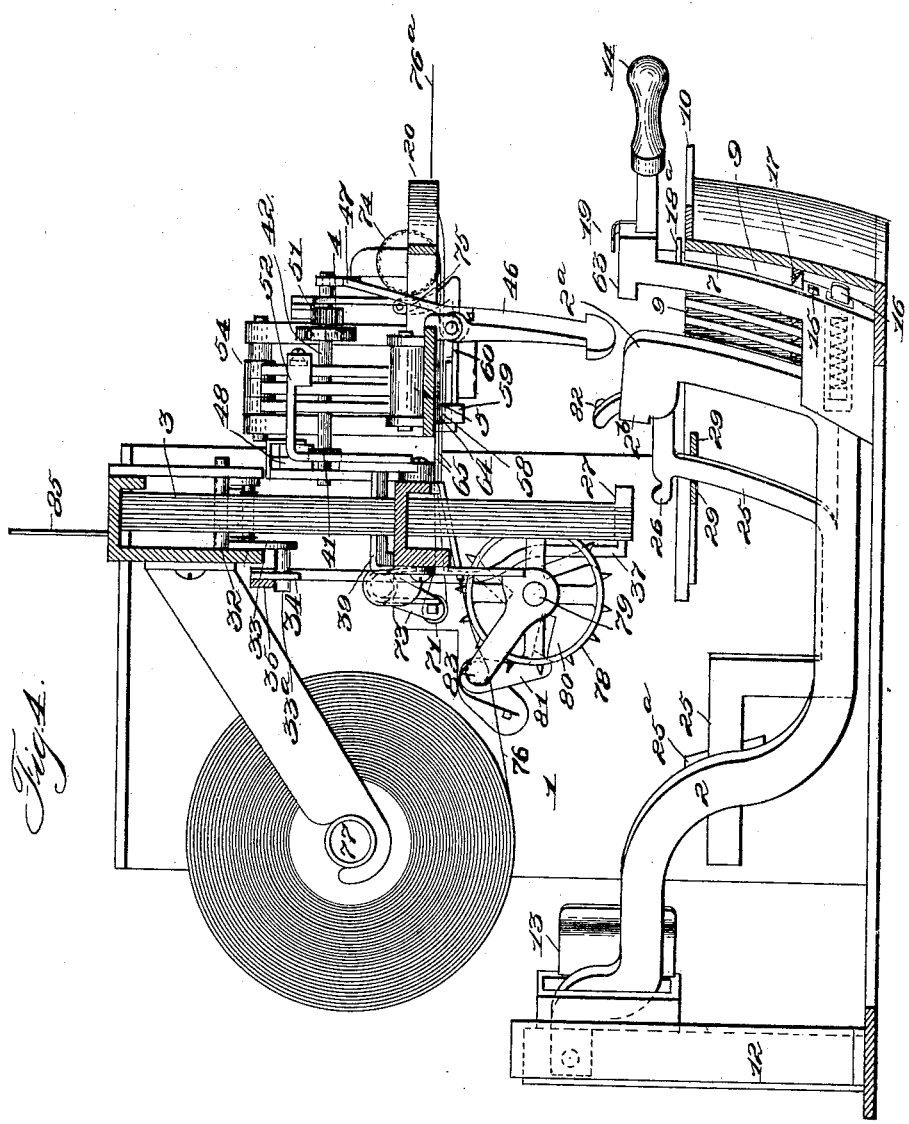
Figure 5:
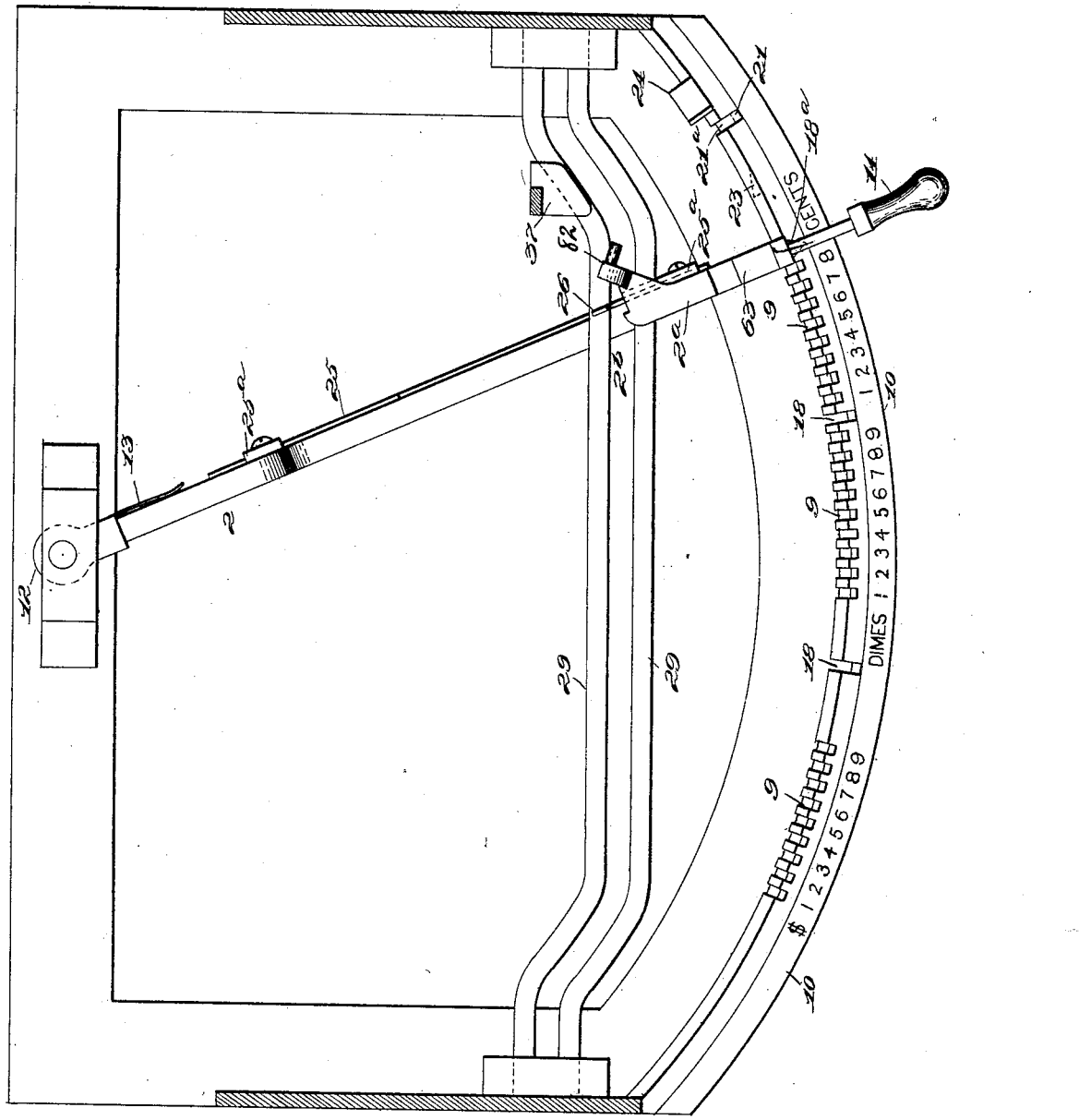
Figure 6:
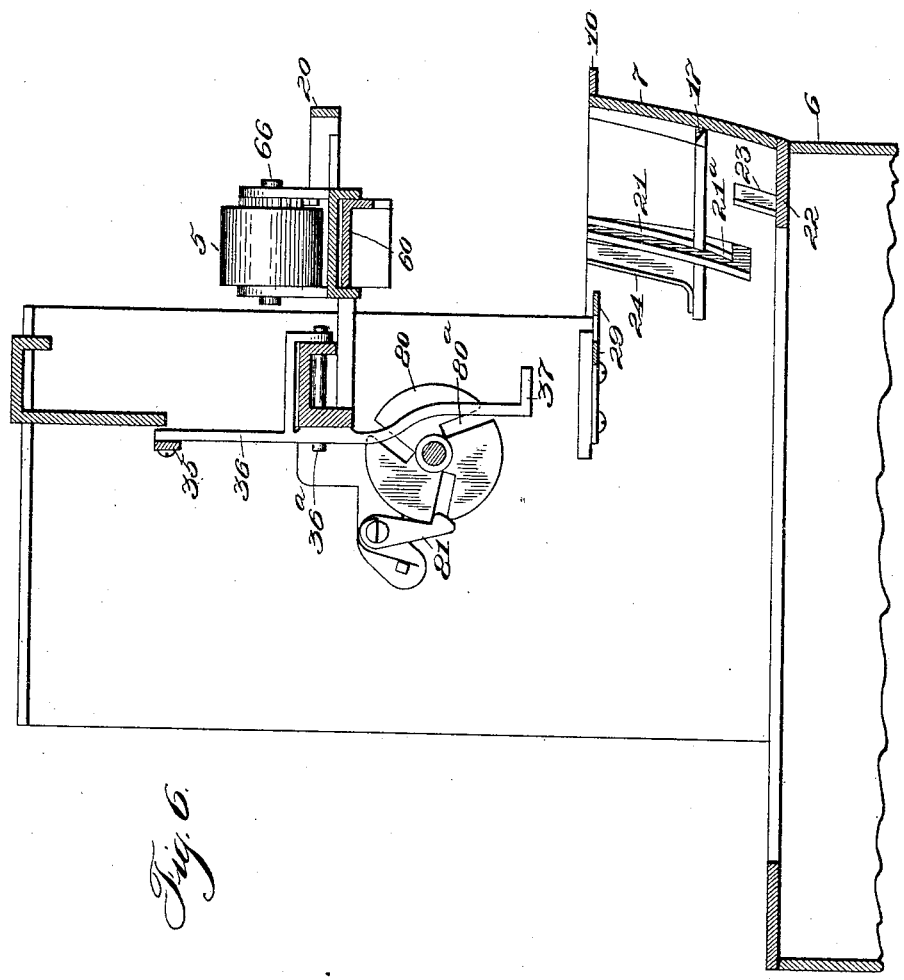

In the appended drawings, forming part of this specification, Figure 1 represents a front elevation of the devices embodying my invention with the casing removed. Fig. 2 represents a top plan view of the same. Fig. 3 represents a rear elevation of the said devices. Fig. 4 represents a side elevation, partly in section, of said machine. Fig. 5 represents a top plan view, partly in section, of the lower portion of my said improvement, a number of the parts being omitted for clearness. Fig. 6 represents a vertical transverse section, partly broken away, through said devices. Fig. 7 represents an enlarged detail front elevation of one of the banks of tablets detached. Fig. 8 represents an enlarged detail front elevation of one of the printing-segments and its operating mechanism. Fig. 9 is a detail perspective view showing the register-wheels, the actuating-segments, and the transfer devices. Fig. 10 represents an enlarged detail perspective view of one of the counter wheel-shafts and its shifting lever. Fig. 11 represents a detail perspective view of the platen-operating lever and coöperating parts, and Fig. 12 represents a detail perspective view of the operating-lever engaging the strip-feeding devices.

In the said drawings, 1 represents the frame of the machine; 2, the operating-lever; 3, the indicating-tablets; 4, the registering-wheels, and 5 the detail or record strip.

The frame 1 is constructed so as to receive a suitable slidable drawer 6 and is provided at its front with a segmental wall 7, the inner side of which is formed with a plurality of approximately vertical flanges 9, which form guiding-channels through which a projection of the operating-lever 2 is adapted to pass, as hereinafter more particularly described. A segmental flange 10 is formed at the upper edge of the wall 7 and is provided with designating characters or figures corresponding in position with the aforesaid channels, Fig. 5, so that the valuation of each may be ascertained at a glance. These characters are divided in the present instance into three groups or banks, which represent, respectively, units of cents, tens of cents, and dollars; but I do not care to limit myself to this capacity, as the same may be increased or decreased to any desired extent without departing from the spirit of my invention.

The before-mentioned operating-lever 2, which is adapted to travel over the flange 10, is pivoted at its rear end in a vertical slot 11, formed in a vertical rock-shaft 12, said rock-shaft having bearings mounted on the main frame. A flat spring friction-plate 13 is rigidly mounted upon the post 12 and engages the side of the operating-lever under sufficient tension to hold said lever in any position of its vertical movement in relation to the post into which it may be moved. The forward end of the said operating-lever projects upward and outward and terminates in an operating-handle 14, which projects over the segmental flange 10, so that it may be grasped and the lever either elevated or lowered or moved from side to side thereby. Said forward end of the lever is further provided with a guiding-lug 15, Fig. 4, and a spring-pressed plunger 16, the normal position of the latter being such as to project under a beveled flange 17, which extends over the lower ends of the aforesaid channels. The said guiding-lug is of such length that it is free to rise in the said channels at all times, and when the operating-lever 2 is raised so that the lug 17 begins to ascend one of the channels the spring-pressed plunger 16, striking the beveled under edge of the flange 17, will be thereby forced backward until it passes the flange 17, when it springs out again and prevents the operating-lever from being returned to its lower position until after it has passed entirely through the channel, as will be more fully described hereinafter. Between each of the banks or sections of characters the wall 7 is formed with a free and deeper groove or channel 18, (see Fig. 5,) through which the lug 15 and plunger 16 may freely pass either in an upward or a downward direction. In order to ascertain when the operating-lever is in the correct position to secure the registration of any desired numeral, the said lever is provided with an index-finger or pointer $18^a$, so arranged as to travel over the segmental numeral-plate and be brought into alinement with the different numerals thereon. The upper portion of the aforesaid operating-lever is further provided with a friction-spring 19, which when the lever is in its elevated position contacts with the under side of a segmental frame 20, Fig. 4, arranged directly above the aforesaid segmental wall, and by this means prevents all abnormal concussion on the upward stroke of said lever. At the same time the lever is held firmly under spring tension when moving laterally in its upper position and is thus prevented from noisy or loose movement. In addition to the aforementioned channels the segmental wall 7 is formed with an end groove or channel 21, Fig. 3, having an inclined lower end formed by the square shoulder $21^a$ at its lower end, so that when the operating-lever is lowered at the end of its lateral stroke the lug 15 and plunger 16 pass into this channel, and as the lever descends the plunger is forced, as it passes over the shoulder $21^a$ when said plunger springs outward, under the square shoulder, and thus prevents any reverse movement of the lever at this point. When in its lowered position, the operating-lever rests upon a flange 22 and when moved a short distance away from the channel 21 encounters a stop-lug 23, having an inclined face, Figs. 3 and 6. As the lever passes this stop the plunger 16 is forced inward, but subsequently passes behind said stop, so as to prevent any reverse lateral movement of the lever on the flange 22. Any shock or concussion when the operating-lever reaches the right-hand end of its stroke in its upper position is avoided by a vertically-disposed stop-wall 24, mounted on the wall 7 in proximity to the upper end of the channel 21 and acting as a stop for said lever.

A slide-frame 25 is mounted in suitable guides $25^a$ upon the lever 2, Figs. 4 and 5, and is formed with a lifting-nose 26, which latter swings laterally with the operating-lever, and when said lever is raised said nose is arranged to move vertically upward as the lug 15 moves through one of the channels. Secured to the lower end of each of the indicator-plates is an operating-foot 27, Figs. 1 and 4, and as the lever is moved upward the nose 26 will strike the foot of the tablet representing the number to be registered, as will be described. The feet 27 are arranged in a straight line across the machine, and as the elevating-nose 26 must pass directly under them a portion of the slide-frame 25 passes between the guides 29, which where they pass under the series of indicator-plates are parallel, as shown in Fig. 5, so that as the operating-lever is swung laterally and describes the arc of a circle the frame 25 moves longitudinally of said lever in its guide $25^a$ and the elevating-nose moves in a straight line, as will be readily understood.

By means of the above-described devices the lifting-nose 26 may be brought below any one of the feet 27 and then elevated to lift the desired indicator slide or tablet plate 3. These slides are mounted in three banks or groups, representing, respectively, units of cents, tens of cents, and dollars, and are provided, respectively, with characters for designating the values which they represent. In each group, Figs. 1, 4, and 7, of said slides all except the hindmost are cut away near their lower ends, whereby the operating or lifting feet of all the slides may extend forword into the path of the lifting-nose. Each tablet is further formed with an aperture 30, having shoulders $29^a$ and 31, the latter being adapted to hold the slide in an elevated position by engaging over one of the three spring-pressed supporting-wings 32, Fig. 1, mounted on the frame. Each of the apertures 30 has an offset $30^a$ to permit the swinging movement of the frames or yokes 39, which respectively pass through the apertures 30, Fig. 1, and arranged to swing upon their pivot-shafts $39^a$. When a tablet in one of the banks is raised, it operates the yoke 39 of that particular bank and in so doing causes said yoke to pass over the shoulder $29^a$ of the remaining tablets of said bank, and thus prevents said tablets being raised. Each of the said wings 32 is provided with a crank-arm 33, having a horizontal end $33^a$, by means of which it may be retracted against the tension of its spring to allow the elevated tablet to drop when a succeeding operation of the machine is commenced. The three wings 32 are moved simultaneously to release the elevated tablets and allow them to drop from exposed position by rigid arms 34, carried by a slide-bar 35, which in turn moves in a fixed guide $35^a$ and is pivotally connected to a vertical operating-lever 36, which is pivoted to the frame at $36^a$ and is formed at its lower end with a horizontally-extending head 37, adapted to be struck by a portion 83 of the operating-lever when the latter is moved laterally in its lower position. In order to prevent excessive concussion upon the return of the slide-bar 35 to normal position, a flat spring 38 is mounted near one end of said slide and is arranged to receive and absorb the impact and at the same time to form an effectual stop. The top walls $30^b$ of the apertures 30 of the indicator-slides are in the same horizontal plane, Fig. 7; but the lower walls $30^c$ are graduated distances from the horizontal portion of the frames or yokes 39, the distance of each therefrom depending upon the numerical designation of the respective slides. Through the apertures of each bank of tablet-slides passes the horizontal portion of one of these yokes, so that when one of the slides is raised the lower wall of its aperture will engage the horizontal plane of the yoke 39 which coöperates with that particular bank of slides and raise it a certain distance, as will be readily understood.

It will be observed from the above that the respective yokes are moved varying distances, depending upon the valuation of the operating-tablet. From the yokes the movement is transmitted to the register-wheels 4 by segmental racks 40, pivoted concentrically with the yokes and to which the latter are secured, respectively, so as to move therewith, and each is arranged during its movement in one direction to engage one of a series of register-operating pinions 41, each of which, respectively, is mounted upon rotatable transversely-movable shafts 42. Each shaft is further provided with a register-wheel 4, and the cents and the dimes registering-wheels, being the two shown near the right-hand end of Fig. 9, are each provided with a transfer-cam 44. Each shaft is formed near one end with an annular groove 45, Fig. 2. In order to shift the shafts 42 endwise to throw the register-wheels into and out of gear with the curved segments 40, I provide three pivoted shifting-frames 46, one for each bank of tablet-slides, which are each formed with a slotted arm 47, which embraces its respective shaft 42 by entering the annular groove therein, Fig. 1. The location of the shifter-frames is such that their lower ends normally lie in the path of the vertical arm 2ᵃ of the operating-lever, Fig. 4, so that when the latter is raised the arm 2ᵃ will contact with the frame in alinement therewith, and thus force said frame forward against the tension of its spring and cause the shaft 42, engaged by said frame, to be shifted rearwardly to bring its pinion into mesh with its operating-rack. The operated frame is maintained in the operative position just described until the operating-lever has completed its upward stroke and has commenced a lateral movement in its upper position. Suitable retaining-pawls 48 are mounted upon the main frame and engage the respective pinions 41 to prevent any accidental or backward movement of the same, but leave them free to move forward or to be shifted rearwardly. The transfer devices between the respective register-wheels are substantially the same in each instance, and the description of one will therefore suffice for all. After one register-wheel has made a complete revolution its transfer-cam 44 engages and moves one end of a pivoted spring-pressed transfer-lever 49, which is provided at its opposite end with a spring-pressed pawl 50, arranged to engage and operate a pinion 51, mounted on the shaft of the register-wheel of next higher denomination.

The above description relates exclusively to the registering mechanism and its operation, and I will now pass on to a description of the printing devices employed in connection therewith.

Each of the segmental racks 40 is provided with an extension-arm 52, and each of said arms is in turn provided with a pivoted link-bar 53, which is connected to one of a series of pivoted weighted segmental frames 54, mounted side by side and having printing-types formed on their concave peripheries. By this means any movement of the segmental racks will cause a simultaneous and proportionate movement of the segmental printing-frames, and thus bring the proper printing-types into printing position. The printing-segments are of course held in the positions to which they are moved as long as the tablet-slides are held elevated, and when released by the releasing of the slide are returned to their normal positions by the gravitating action of the weighted portions thereof. In order to correctly aline the printing-types when brought to printing positions, each of the type-segments is formed with an internal rack the teeth 54ᵃ of which are arranged to be engaged by an alining-pawl 55, mounted upon an arm 56, which forms an integral part of the weighted frame 57, whereby the alining-stud is normally held out of the path of the teeth of the internal racks. The frame 57 is operated through the medium of a pendent lug 58, secured thereto, and a spring-arm 59, carried by the platen 60, Fig. 1, which is pivoted to the main frame 60ᵃ under the printing-segments and is normally held away from said segments by a suitable spring 60ᵇ, mounted upon its pivot-pin. The right-hand end of the said pivoted platen is formed with a flange 62, having an incline upper surface, Fig. 1, which is arranged to be struck by a nose 63, Fig. 4, formed on the operating-lever, and thus forced downward. This downward movement of the right-hand end of the platen causes the left-hand end to be forced upward, and thus elevate the record-strip 64, Fig. 4, and force it, together with the printing-ribbon 65, against the types. Just before the platen reaches printing position the alining-stud is forced downward into engagement with the teeth of the printing-segments, and thus effects a proper alinement of the types and locks the segments in position during the printing operation. This is accomplished by the upward pressure of the spring-arm 59 of the platen against the stud 58 of the frame 57, said arm bending to allow further movement of the platen after the alining-stud has engaged the rack of the printing-segment. The above-mentioned record-strip passes from a supply-roller 66, journaled on the frame, down under the printing-segments and is fed forward by a winding-roller 67, also mounted on the frame and provided with a ratchet-wheel 68, by means of which it is rotated with a step-by-step motion. This wheel is engaged by a locking-pawl 69 and also by a feeding-pawl 70, which latter is pivotally mounted upon the right-hand end of the platen 60, Fig. 1, to move the ratchet-wheel one notch upon each movement of the platen, and thus feed the paper progressively. The endless printing-ribbon 65 extends at right angles to the detail-strip and is mounted upon spools or rollers 71 and 72. The roller 71 is mounted upon a spring-pressed arm 73, whereby the ribbon is held taut at all times, while the roller 72 is suitably journaled on the frame and is provided with a ratchet-wheel 74, by means of which it is rotated to feed the ribbon. This ratchet-wheel is engaged by a spring-pressed pawl 75, mounted on the platen, so that the ribbon will be moved before each printing operation.

The above-described devices provide for printing the detail-strip; but in addition thereto I also provide a check-strip 76, which passes forward between the ribbon and platen and out of a slot cut in the frame of the machine. This check-strip is wound upon a suitable spool 77 and is preferably formed with a plurality of equidistant perforations $77^a$ and adapted to receive teats formed on the periphery of a feeding-wheel 78, which is suitably journaled on the frame. The latter receives motion from a shaft 79, upon the right-hand end of which is fixed an actuating-wheel 80, Figs. 1 and 6, having cam-slots $80^a$ formed therein and engaged by a spring-pressed restraining and alining pawl 81. The said cam-slotted wheel is actuated by a finger 82, carried by the operating-lever, Figs. 4 and 5, and adapted to enter any one of the cam-slots when the lever reaches the right-hand end of its stroke in its upper position, so that when said lever is depressed the finger will engage the wall of the slot it has entered, and thus turn the wheel. The check-strip is held firmly about the feeding-wheel 78 by a guide-arm 83, mounted upon the frame and extending in front of the said wheel.

The operation of the machine is as follows: In the normal position of the machine the indicators designating the amount of the last-recorded transaction are exposed, and the operating-handle is in its lower path of travel and at the right hand of its movement. When a registration—say of four dollars and ninety-five cents—is to be made, the operating-lever is first swung to the left through the lower path of its travel until the index $18^a$ points at the four-dollar mark on its flange 10. It is then raised through the four-dollar channel in the wall 7, then moved to the right along its upper path of travel, then lowered again through the open channel 18 between the banks, then raised through the ninety-cent channel, then lowered through an open channel and again raised through the five-cent channel, and finally lowered again through the open channel 21 at the end of its lateral stroke. Each time the handle is raised through one of the channels, as described, the proper tablet-slide of the respective bank is elevated and, as described, simultaneously records the amount upon the proper register-wheel. As the operating-handle is started from normal position the rear edge $2^b$ of the arm $2^a$ of the operating-lever strikes the inclined edge of the foot 37, and thereby swings the lever 36 and moves the slide 35, so that the arm 34, through the crank-arm 33, retracts the wing 32 to permit the indicators, and consequently the printing-segments, to return to normal position. The check-strip is fed, it will be noticed, during the very last of the movement of the lever—that is, while the latter is descending the channel 21. Thereby the printed end $76^a$ of the check is moved forward and projected through a slot $76^b$, Fig. 1, in the frame 20, where it may be grasped and torn off.

Any suitable inclosing casing or cabinet is placed about the devices and formed with suitable sight-apertures for the indicators and slots for the passage of the operating-lever.

As all of the tablets in the two right-hand banks remain down out of sight when the dollar-bank alone is operated, it becomes necessary to provide means for indicating zero in these banks, and such means I provide in a stationary plate 85, provided with suitable zero characters, which remain in view at all times except when obscured by the raised tablets.

Having thus described my invention, what I claim as new, and desire to secure by Letters Patent, is—

1. In a cash-register, the combination with graduated indicating-tablets arranged in banks, registering-wheels, one for each bank, operating devices coöperating with said indicators, and independent means for each wheel for throwing it into connection with its respective operating device when one of the tablets of its bank is operated.

2. In a cash-register, the combination with a printing-segment having a rack formed thereon, means for moving said segment, an alining device arranged to engage said rack, and a platen carrying a spring-arm which is arranged to operate the alining device before the platen reaches printing position.

3. In a cash-register, the combination with a registering mechanism arranged in banks, of operating devices for the same, an operating-lever and independent means for each bank arranged to be moved by the operating-lever to throw the operating devices of that particular bank into operative position.

4. In a cash-register, the combination with a series of independent indicating-tablets, of a lever arranged to actuate said tablets, and means controlled by the lever for positively locking all the remaining tablets in normal position when one is operated.

5. In a cash-register, the combination with a series of indicator-plates arranged one in front of the other and having apertures of graduated lengths, of a movable registering-frame extending through all of said apertures and arranged to be engaged and raised by the lower walls of the same.

6. In the cash-register, the combination with a plurality of indicating-tablets having coinciding graduated apertures, of a movable frame extending through all of said apertures, a registering mechanism connected to said frame, and devices for operating the tablets.

7. In a cash-register, the combination with a series of indicating-tablets, of a swinging lever for raising any one of said tablets, a movable operating device mounted on said lever and means for alining said device with any of the several tablets when the lever is swung laterally.

8. In a cash-register, the combination with a series of independent indicating-tablets, arranged in banks, pivoted yokes coöperating with the respective banks of indicators, registering-wheels one for each yoke, independent devices for throwing said wheels into connection with their respective yokes and a lever for operating the tablets and said throwing devices.

9. In a cash-register, the combination with a plurality of indicating-tablets arranged in series, of means for raising the tablets of the different series successively to indicating position, registering-wheels, devices for moving said wheels into operating position, means actuated by said indicators to turn the registering-wheels, and means for retracting the registering-wheels to normal position.

10. In a cash-register, the combination with a registering mechanism, of a series of devices for operating the same arranged substantially in a line, an operating-lever and movable alining means mounted on said lever and arranged to move in alinement with the operating devices.

11. In a cash-register, the combination with a series of indicating-tablets, of a pivoted operating-lever, an operating device movably mounted on said lever, and spaced stationary strips arranged to receive and guide said device to cause it to properly operate the desired tablet.

12. In a cash-register, the combination with a plurality of indicating-tablets, each comprising a plate provided with a lifting-arm at its lower end and formed with an aperture having a projection on one of its walls, of wings projecting through said apertures and arranged to engage said projections to hold the tablets elevated, operating-yokes also extending through said apertures, means for releasing said wings, operating devices arranged to engage the lifting-arms, and a registering mechanism connecting to said operating-yokes.

13. In a cash-register the combination with operating devices, of a counter comprising a series of counter-wheels, and a single operating-lever arranged to throw any desired one of the counter-wheels into connection with the operating devices and operate it to the desired extent.

14. In a cash-register the combination with a register-operating mechanism, arranged in banks, of a counter comprising a series of wheels each of which is operated by its respective bank, an operating-lever and independent means for each bank arranged to be operated by said lever to throw its respective counter alone into operative position.

15. In a cash-register, the combination with a registering mechanism, of a bank of indicating-tablets, a lever adapted to move any one of said tablets to indicating position, and means for locking all the remaining tablets when one is moved from normal position.

16. In a cash-register the combination with printing devices arranged side by side and having alining teeth formed thereon, of means for moving said devices, a pivoted alining device arranged to simultaneously engage the teeth of all of said printing devices, and a platen mounted independently of the alining device and provided with a flexible arm arranged to operate said alining device before the platen raises to printing position.

17. In a cash-register the combination with a frame having grooves formed therein, of a registering mechanism, a pivoted operating-lever having a lug which extends under a portion of the frame and normally holds the lever down but which may be brought into alinement with the grooves to allow the lever to be raised at certain points and a spring-actuated member mounted on the lever and arranged to coöperate with said frame to prevent backward movement of the lever.

18. In a cash-register the combination with an operating mechanism, of an operating-lever capable of both lateral and vertical movements and a movable latch on said lever for compelling a lateral movement of the lever at a period between the upward and downward strokes of said lever.

19. In a cash-register the combination with an operating mechanism, of an operating-lever capable of both lateral and vertical movements, means for guiding said lever vertically after its initial movement, and devices for preventing a return movement of the lever in the same vertical plane.

20. In a cash-register the combination with an operating mechanism, of an operating-lever capable of both lateral and vertical movements, and devices for compelling a lateral movement of said lever between its first and final vertical movements.

21. In a cash-register the combination with a registering mechanism, of indicating-tablets, a lever arranged for operating any one of said tablets and a shiftable device movably mounted upon said lever and arranged to be shifted by its movements and also be elevated thereby so as to engage and actuate the desired indicator.

22. In a cash-register the combination with a plurality of indicating-tablets having graduated apertures of a movable frame extending through said apertures, a pivoted printing-segment, means connecting said segment and frame and devices for operating the indicators.

23. In a cash-register, the combination with the registering-wheels and a registering mechanism, of indicating-tablets arranged to actuate the same to register amounts equal to the numerical designation of the operated tablets, a swinging lever for raising any one of said tablets and means for alining a movable part of said lever with the desired tablet.

24. In a cash-register the combination with a plurality of indicating-tablets having graduated apertures, of a pivoted frame extending through said apertures, a registering mechanism, means connecting said frame and mechanism and devices for operating the tablets.

25. In a cash-register, the combination with registering mechanism comprising independently-actuated registering-wheels, devices for turning said register-wheels, an operating-lever and independent means for each bank arranged to be moved by the operating-lever to throw one of the register-wheels into mesh with the operating devices.

26. In a cash-register the combination with a plurality of indicating-tablets having graduated apertures, of a pivoted frame extending through said apertures, a pivoted printing-segment, a link connecting said frame and segment, and means for operating said tablets.

27. In a cash-register, the combination with a registering mechanism, of an operating-lever capable of both lateral and vertical movements, means connecting said lever to said mechanism, a frame having grooves each with a flange at its lower end, and a plunger carried by the lever and coöperating with said flanges.

28. In a cash-register, the combination with a registering mechanism, of an operating-lever having a lug which normally prevents it from rising, means connecting said lever to said mechanism, a wall having vertical grooves formed therein to receive said lug, a flange partly closing the lower end of each groove, and a plunger on said lever adapted to move through said grooves.

29. In a cash-register, the combination with a plurality of indicating-tablets formed with apertures of different depths, and having locking-shoulders, of a frame extending through said apertures and arranged to be moved by the walls of the same, registering mechanism connected to said frame and means for raising said tablets whereby the registering mechanism is actuated and the frame moved over the shoulders to lock the remaining tablets.

30. In a cash-register, the combination with a plurality of indicating-tablets having graduated apertures, of a movable frame extending through said apertures, a printing device connected to said frame and means for raising the tablets.

31. In a cash-register, the combination with a plurality of indicating-tablets having graduated apertures, of a movable frame extending through said apertures, a rack carried by said frame, a registering mechanism operated by said rack, and means for raising the tablets.

32. In a cash-register, the combination with a series of indicating-tablets having graduated apertures, of a movable frame extending through said apertures, a rack on said frame, a registering-wheel having a pinion arranged to mesh with said rack, and operating means for raising said tablets and moving said pinion into mesh with the rack.

33. In a cash-register, the combination with the register-wheels, the printing-segments and a platen, of an operating-lever movable in one direction to adjust the printing-segments and in another direction to actuate the platen.

34. In a cash-register, the combination with a series of plates having coinciding graduated apertures and arranged one in front of the other, of a movable frame extending through all of said openings, a registering-wheel normally disengaged from said frame, actuating devices for said plates and means for bringing the registering-wheel into engagement with the movable frame during one movement of the latter.

35. In a cash-register, the combination with a plurality of plates formed with coinciding graduated apertures, of a movable frame extending through all of said openings so as to be moved to a greater or less extent according to the plate operated, a register-wheel arranged to be operated by the movable frame, and a single lever for actuating said plates.

36. In a cash-register, the combination with register-wheels, of operating-plates arranged in banks and adapted to be independently actuated, a lever arranged to actuate said plates, shifting means, one for each register-wheel and arranged to be actuated by said lever to shift the registering mechanism into connection with the operating-plates.

37. In a cash-register, the combination with a registering mechanism, of indicating-tablets of different numerical designations arranged to operate the registering mechanism to record the amount of the numerical designation of the operated tablet, a lever arranged to actuate any one of said tablets, and means for locking all the remaining tablets in position when one is operated.

38. In a cash-register, the combination with a series of indicating-tablets arranged approximately in a straight line, of a pivoted operating-lever, and a movable alining means mounted on said lever and arranged to move in alinement with said tablets so as to be capable of lifting the same regardless of the position of the lever carrying said alining means.

39. In a cash-register, the combination with operating devices, of a counter comprising a series of counter-wheels and an operating-lever for the operating device arranged to be adjusted to throw any desired one of the counter-wheels into connection with the operating devices and move the same by a single operation.

40. In a cash-register, the combination with operating devices, of a counter comprising a series of wheels normally out of connection with the operating devices and transfer means between said wheels and an operating-lever arranged to be adjusted to throw any desired one of the counter-wheels into connection with the operating devices.

41. In a cash-register, the combination with operating devices, of a counter comprising a series of counter-wheels, and an operating-lever arranged to be moved in one direction to select the desired counter-wheel and in another direction to bring said wheel into connection with the operating devices.

42. In a cash-register, the combination with operating devices, of a counter comprising a series of counter-wheels and an operating-lever arranged to be moved horizontally to select the desired counter-wheel and vertically to throw the same into connection with the operating devices.

43. In a cash-register, the combination with operating devices, of a counter comprising a series of counter-wheels mounted on longitudinally-movable shafts, and a lever arranged to operate any one of said shafts to bring its counter-wheel into connection with the operating devices.

44. In a cash-register, the combination with graduated indicating-tablets arranged in banks, registering-wheels, one for each bank, operating devices coöperating with said indicators, independent means for each wheel for throwing it into connection with its respective operating device, and a lever arranged to operate any one of said tablets and simultaneously actuate the respective throwing means.

45. In a cash-register, the combination with graduated indicating-tablets arranged in banks, registering-wheels one for each bank, operating devices coöperating with said indicators, levers for the respective wheels for throwing them into connection with the operating devices, and a hand-lever arranged to operate any one of said tablets and the respective throwing-lever.

46. In a cash-register, the combination with graduated indicating-tablets arranged in banks, registering-wheels one for each bank, operating devices carrying racks and coöperating with said indicators, independent means for the respective wheels for throwing them into connection with the racks, and a lever arranged to operate any one of said tablets and the respective throwing means.

47. In a cash-register, the combination with a plurality of indicating-tablets formed with apertures having locking-shoulders, of a frame extending through said apertures and arranged to be moved by the walls of the same whereby when one tablet is raised the frame is moved over the locking-shoulders of the remaining tablets.

48. In a cash-register, the combination with a plurality of indicating-tablets having graduated apertures, of a movable frame extending through said apertures, a movable printing device connected to the frame, and means for operating the tablets.

49. In a cash-register, the combination with a registering mechanism, of a series of devices for operating the same arranged in a straight line, a pivoted lever, an operating device movably mounted on said lever, and means for alining said movable device with the operating devices as the lever is moved about its fulcrum.

50. A cash-register comprising a series of indicators, a support a member pivotally secured to the latter, an operating-lever hinged to said member and coöperating with said indicators when operated for elevating any one of said indicators, a suitable printing device and suitable mechanism coöperating with the lever and said printing device.

51. A cash-register comprising a series of indicators, a support, a member pivotally secured to the latter, an operating-lever hinged to said member and adapted to coöperate with the indicators for raising any one of the same, a rocking frame actuated by said lever, a suitable printing device and suitable gearing interposed between said rocking frame and printing device.

52. A cash-register comprising a suitable casing, a series of indicators located within the same, a support, a member pivotally secured to the latter, an operating-lever hinged to said member and adapted to coöperate with the ends of the indicators to raise the latter, a rock-frame actuated by said lever, a printing device operated by said lever, and inking means operated by said frame.

53. In a cash-register the combination with a series of indicators, a support, a member pivotally mounted on said support, a lever hinged to said member and coöperating with the indicators to elevate the same, printing-types controlled by said lever and printing mechanism also controlled by said lever.

54. In a cash-register the combination with a series of indicators, a support, a member pivotally secured to the latter, an operating-lever hinged to said member, and adapted to coöperate with the free ends of said indicators for elevating any one of the same, a rocking frame actuated by said lever, said casing having a slot formed therein for the lateral movements of said lever and vertical passages for permitting vertical movements of said lever, a printing device and mechanism coöperating with the lever and printing device.

55. In a cash-register the combination with a lever having both lateral and vertical movements of a series of indicators arranged to be elevated by said lever, a rocking frame actuated by said lever, an ink-ribbon, strip-feeding devices and means connecting both the ink-ribbon and strip-feeding devices to the rocking frame.

56. In a cash-register a printing device consisting of supporting-rollers, a ribbon connecting the same and arranged to be fed thereby, rollers for supporting and feeding a paper strip in proximinity to the ink-ribbon, but at an angle thereto, a rocking frame and means connecting said frame and the respective feed-rollers whereby the ribbon and paper strip are simultaneously fed.

57. In a cash-register the combination with a series of indicators, of a register, register-actuating means controlled by the indicators, and a lever arranged when moved laterally to select a desired indicator and when moved vertically to bring the register and register-operating mechanism into connection and operate the selected indicator.

In testimony whereof I affix my signature in the presence of two witnesses.

PHILIP YOE.

Witnesses:
IRA BERKSTRESSER,
ALVAN MACAULEY.